United States Patent Office 3,107,154
Patented Oct. 15, 1963

3,107,154
PROCESS FOR THE PRODUCTION OF ELEMENTARY BROMINE FROM AQUEOUS BRINES
Ozjasz Schächter and Abraham Baniel, Haifa, Israel, assignors to Makhtsavei Israel, Haifa, Israel
No Drawing. Filed Apr. 17, 1962, Ser. No. 188,265
4 Claims. (Cl. 23—217)

The present invention concerns the production of elementary bromine.

Elementary bromine is produced by the introduction of elementary chlorine into aqueous bromide solutions, e.g. natural or artificial brines, bitterns or ocean water, followed by the separation of the liberated elementary bromine from the solution. In conventional processes the bromine is evaporated from the solution, which is usually rather dilute, in either of the two following ways:

(1) Carrying off the bromine by means of a current of steam conducted into the bromine solution, and separation of the bromine from the condensate (Kubierschky's method);

(2) Blowing the bromine out by means of an air stream passing through the bromine solution and recovery of the bromine from the bromine-laden air stream.

In both these methods the expulsion of the bromine from the dilute brine consumes a large amount of energy, which makes these methods expensive.

It has been proposed to extract the bromine from the aqueous solution by means of an organic solvent substantially immiscible with water and either to separate the bromine from the solvent by distillation or to subject the bromine, while so dissolved, to a chemical reaction, e.g. with aqueous ammonia for the formation of ammonium bromide. This proposal of separating the bromine from the extract or converting it into a bromide has not been found to be practical.

It is therefore the object of the present invention to provide a process for the production of elementary bromine from aqueous bromide solution wherein the consumption of energy is decreased.

According to the invention, elementary bromine is produced by the introduction of chlorine into an aqueous liquor containing not less than 0.5 g. of bromide ion per liter, the bromine is extracted from the aqueous liquor by means of a solvent being a brominated hydrocarbon, the extract is stripped of the dissolved elementary bromine by being contacted with an aqueous bromide solution containing at least 50 g. of bromide ion per liter, and from this solution the elementary bromine is recovered.

In the context of this invention the term "bromide" is meant to include both metal bromides and hydrogen bromide. Brominated hydrocarbons suitable for use as solvents in the process according to the invention are, for example, ethylene dibromide, propylene dibromide and tetrabromoethane.

The concentration of the bromine in the aqueous stripping liquor is comparatively high and the heat requirements for the recovery of the bromine from this liquor are correspondingly small. Thus the process according to the invention compares favourably as regards energy expenditure with both the steaming and the blowing-out processes.

The invention is illustrated by the following examples to which it is not limited.

*Example 1*

Chlorine gas was introduced into Dead Sea (Israel) brine containing 10 g. of bromide ion per liter, at the rate of 4.8 g. of chlorine per liter of brine, whereby the whole amount of bromide was decomposed and the bromine liberated. The bromine was then extracted from the brine with ethylene dibromide recycled from the stripping stage (see below) and containing a small amount of residual bromine. This extraction was carried out in countercurrent at a brine:ethylene dibromide ratio of 10:1 in a conventional mixer-settler apparatus. This consisted of three units comprising each a mixing vessel and a settling vessel, and provided about two theoretical extraction stages. (The term "theoretical stage" denotes "one where contact between phases is sufficiently intimate and maintained for a sufficient period of time that distribution equilibrium is established, so that raffinate and extract are equilibrium solutions"—see R. E. Treybal, Liquid Extraction, McGraw-Hill, 1951.) The working volume of each mixer was 400 ml., that of each settler 800 ml. The volume of brine fed to the apparatus was 45 to 50 liters per hour, with holding times of the order of 30 seconds in each mixer, and of 60 seconds in each settler. The extract leaving the apparatus contained 95 to 98 g. of bromine per liter, while the amount of bromine left in the extracted brine had decreased to 0.2 to 0.3 g. per liter.

For stripping the extract of its bromine contents it was contacted in countercurrent with an aqueous HBr solution containing about 40% by weight of HBr. This hydrobromic acid solution was returned from the bromine recovery step (see below) and contained about 5 g. per liter of free bromine. The apparatus used for the stripping stage was of the same type as that described above but it comprised 15 mixer-settler units providing for about 10 theoretical stages. The volume ratio extract-stripping solution was 1:1, the holding times were as in the extraction stage.

The stripped ethylene dibromide contained about 3 g. per liter of bromine and was recycled to the extraction stage (see above). The aqueous stripping liquor contained about 100 g. of elementary bromine per liter. From it the elementary bromine was recovered by indirect heating to 120° C. The bromine was evaporated thereby together with some water, the vapours were condensed by cooling and the liquid bromine was separated from the condensed water. The residual aqueous stripping liquor contained 5 g. of bromine per liter. It was cooled and recycled for stripping another portion of extract. The recovered bromine was free of HBr.

The overall bromine yield exceeded 95%, calculated on the bromide contents of the brine. The amount of chlorine contained in the bromine was well below the minimum tolerated in a commercial product.

*Example 2*

The process was carried out as described in Example 1, except that tetrabromoethane was used instead of ethylene dibromide as the extracting solvent.

The tetrabromoethane extract contained 95 g. per liter of bromine. It was stripped of dissolved elementary bromine by a 40% aqueous HBr solution recycled from the bromine recovery stage and containing about 5 g. per liter of free bromine. The apparatus used was of the same type as described in Example 1, and provided for 8 theoretical extraction stages. The volume ratio of stripping liquor-tetrabromoethane was 1:1. After the stripping operation the stripping liquor contained about 100 g. of elementary bromine per liter.

The tetrabromoethane raffinate was recycled to the extraction stage. From the aqueous stripping liquor the bromine was recovered in the manner described in Example 1, and the residual HBr solution was recycled to the stripping stage. The overall yield of bromine was 95%, calculated on the bromide content of the brine.

*Example 3*

By means of ethylene dibromide recycled from a preceding extraction and stripping stage and carrying with it about 10 g. of bromine per liter, an ethylene dibromide-bromine extract containing altogether 105 to 108 g. of bromine per liter was obtained from the chlorinated starting brine in the manner described in Example 1. This extract was stripped of dissolved bromine with a nearly saturated aqueous potassium bromide solution in a volume ratio of stripping liquor ethylene dibromide=2:1. The apparatus used was of the same type as described in Example 1 and provided seven theoretical stages. The ethylene dibromide raffinate contained about 10 g. per liter of bromine and was recycled to the extraction stage. The stripping liquor contained 51 g. per liter of free bromine which was recovered by evaporation by indirect heating of the liquor to 150° C. The residual stripping liquor contained a residual amount of bromine of 3 g. per liter and was returned to the stripping stage.

Instead of or in addition to hydrogen bromide or potassium bromide, the stripping liquor may contain other bromides, e.g. sodium, magnesium, calcium or ferric bromide, and, in a general way any bromide capable of combining with elementary bromine with the formation of perbromides.

In the specific examples given hereinbefore the stripping liquor contained as much as 50 to 100 g. per liter of dissolved elementary bromine, against a bromine content of 10 g. per liter of bromine of the chlorinated bromide brine (and this under the very favourable conditions of the Dead Sea brine). The recovery of the bromine by evaporation thus requires a fraction of the thermal energy required for the recovery of the bromine by evaporation directly from the chlorinated brine.

The bromine dissolved in the stripping liquor may be utilized even without being separated from the latter, e.g. by being converted into bromine compounds within the liquor. Such other uses of the bromine are deemed to be included in the terms "recovered" or "recovery" used in the preceding specifications and the appended claims.

We claim:

1. A process for the production of elementary bromine from aqueous brines containing at least 0.5 gram of bromide ion per liter, comprising the steps of introducing chlorine into the brine thereby to liberate elementary bromine, contacting the chlorinated brine with a solvent consisting of a liquid selected from the group consisting of ethylene dibromide, propylene dibromide and tetrabromoethane thereby to extract elementary bromine from the brine into the solvent, separating the solvent extract from the brine and stripping the solvent extract of at least part of the extracted bromine by contacting the extract with an aqueous bromide solution containing at least 50 gram of bromide ion per liter.

2. A process according to claim 1, wherein the aqueous solution used for stripping the solvent extract of elementary bromine contains at least one bromide selected from the group consisting of alkali metal bromides, alkaline earth metal bromides, hydrogen bromide and ferric bromide.

3. A process according to claim 1, comprising the further step of recovering elementary bromine by evaporation from the aqueous stripping solution.

4. A process for the production of elementary bromine from aqueous brines containing at least 0.5 gram of bromide ion per liter, comprising the steps of introducing chlorine into the brine thereby to liberate elementary bromine, contacting the chlorinated brine with a solvent consisting of a liquid fully saturated aliphatic polybromide thereby to extract elementary bromine from the brine into the solvent, separating the solvent extract from the brine and stripping the solvent extract of at least part of the extracted bromine by contacting the extract with an aqueous bromide solution containing at least 50 grams of bromide ion per liter.

References Cited in the file of this patent

UNITED STATES PATENTS

| | | |
|---|---|---|
| 460,370 | Dow | Sept. 29, 1891 |
| 1,916,094 | Curtin | June 27, 1933 |
| 2,536,457 | Mugdan | Jan. 2, 1951 |